United States Patent [19]

Redman

[11] 3,947,852

[45] Mar. 30, 1976

[54] ELECTRON IMAGE RECORDER WITH SEMICONDUCTIVE IMAGE INTENSIFIER

[75] Inventor: Charles M. Redman, Las Cruces, N. Mex.

[73] Assignee: The United States of America as represented by the Secretary of the Army, Washington, D.C.

[22] Filed: July 25, 1974

[21] Appl. No.: 491,908

[52] U.S. Cl. .......... 346/74 EB; 313/95; 340/173 LS; 178/6.6 A

[51] Int. Cl.² . H01J 31/50; H01J 31/58; G11B 7/02

[58] Field of Search .......... 346/74 EB, 74 ES, 74 J; 313/94, 95, 367, 391, 392; 178/6.6 R, 6.6 A, 6.7 R, 6.7 A; 357/19; 340/173 LS, 173 ER

[56] References Cited

UNITED STATES PATENTS

| | | | |
|---|---|---|---|
| 3,218,496 | 11/1965 | Jensen | 313/95 |
| 3,308,234 | 3/1967 | Bean | 178/6.6 A |
| 3,368,077 | 2/1968 | Kazan | 313/94 |
| 3,401,294 | 9/1968 | Cricchi | 313/392 |
| 3,673,599 | 6/1972 | Tagawa | 178/6.6 A |
| 3,716,[illegible]40 | 2/1973 | Crowell | 313/95 |

*Primary Examiner*—Bernard Konick
*Assistant Examiner*—Alan Faber
*Attorney, Agent, or Firm*—Nathan Edelberg; Robert P. Gibson; Saul Elbaum

[57] ABSTRACT

An optical or photon image is converted by a photocathode to an electron image. A semiconductor plate receives the electron image on a first side thereof. For an electronically controlled time, the image is integrated and stored in thousands of reversed biased PN junctions connected to micro-sized conductors, in the plate. An intensified image is then transfered from a second side of the plate at an electrically controlled time to adjacent moving film which is exposed to intensified images from the plate.

2 Claims, 8 Drawing Figures

ELECTRON IMAGE RECORDER WITH SEMICONDUCTIVE IMAGE INTENSIFIER

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to electron image photography for low light level or high resolution applications.

BRIEF DESCRIPTION OF THE PRIOR ART

Recorders utilizing Electron Image Integration Intensifier Tubes operate on a different principal but are related to high frame rate camera systems involving image intensifiers, optics to transmit optical image from output plate of image intensifier to film, and intermittent action film transports which will hereafter be referred to as the intermittent action camera or IAC. The 70mm IAC approaches its limiting frame rate at 100 frames per sec. The 35mm IAC approaches it's limiting frame rate at 400 frames per sec. One of the objectives of the electrical image recorder (EIR) is to allow frame rates in excess of 300 frames per sec for 70mm cameras and 500 frames per sec for 35mm cameras and corresponding improvements for other size film cameras. The EIIIT camera allows the film to travel smoothly without intermittent action. The primary difference between the EIIIT camera and the IAC are given below; where EIIIT stands for electron image integration intensifier tube.

| Function | Intermittent Action Camera | EIIIT Camera |
|---|---|---|
| Image Integration | Mechanical Shutter | Image Intensified Electronically Turned on |
| Maximum Integration | About 50% of period between frames | Almost 100% of period between frames |
| Film Motion | Film must be stopped for entire image integration time | Film is in continuous constant speed motion |
| Film Exposure | Mechanical shutter | Electronic gating |
| Frames per sec for 70mm film (Max) | About 100 | In excess of 300 |

BRIEF DESCRIPTION OF THE PRESENT INVENTION

The present invention utilizes an image integration and transfer plate which receives an electron image on one side of the plate. The image is integrated and stored, for an electronically controlled time, in thousands of micro-sized PN junctions backbiased to form capacitors. The image is then transfered forward at an electronically controlled time. Uses of the device in tubes and recording systems satisfy specific applications for low light level image recording and/or where frame rates and image resolution must be high.

BRIEF DESCRIPTION OF THE FIGURES

FIG. *2a* is a perspective view of the integration and storage plate, with a portion of the periphery cut away to indicate interior detail.

DETAILED DESCRIPTION OF THE INVENTION

Electron Image Integration Intensifier Tube

Figure 1:
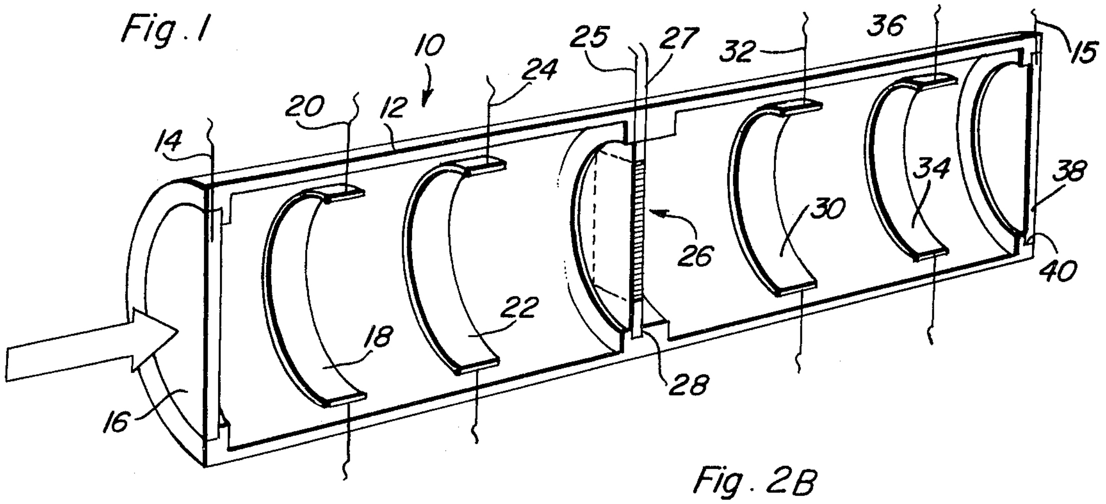
FIG. 1 is a cutaway view of an entire tube assembly which utilizes an integration and storage semiconductor plate.

Referring to the figures and more particulary FIG. 1 thereof, an image intensifying tube is generally indicated by reference numeral 10. The tube includes a cylindrical glass envelope or housing 12. The left end of the envelope has a tranversely mounted photocathode 16 thereat. The photocathode is a conventional device and marketed by RCA and Westinghouse, among others. Structurally, the photocathode includes an outward side which is transparent and is coated with a conductor. The inward side of the photocathode is coated with a material which is sensitive to photons. Photons passing through the outward side of the photocathode, to the photon sensitive material causes an electron to be emitted for each photon that is absorbed by the photon sensitive material. As a result, an electron image is generated at the inward side of the photocathode, this image being projected axially along the inside of the tube. The photocathode 16 is provided with a lead 14 so that an accelerating voltage may be applied between the photocathode 16 and lead 15, from the image output member 38, at the opposite end of the tube.

Electrostatic focus anodes 18 and 22 are concentrically mounted within the tube, at the left end portion thereof. Leads 20 and 24 are connected to the anodes 18 and 22, respectively, to apply potentials thereto. The purpose of the anodes is to keep the image order, as projected by the photocathode.

In the center of the tube is a transversely mounted integration and storage plate, generally indicated by reference numeral 26. The plate has two leads 25 and 27 extending therefrom, so that a voltage may be applied between opposite sides of the plate. The particular construction of the plate 26 will be dealt with in greater detail hereinafter. However, suffice it to say at this point, the plate is capable of integrating and storing an electron image for a relatively long period of time, after which it quickly strobes this image toward the image output end of the tube. The result of course, is an intensified image. As shown in FIG. 1, the integration and storage plate 26 is received within a circular recess 28 where it may be securely fastened.

Additional focus anodes 30 and 34 are positioned at the right of the plate 26. Leads 32 and 36 are respectively connected to the anodes 30 and 34 to apply potentials thereto. The function of the anodes 30 and 34 is the same as the previously discussed anodes 18 and 22.

In the embodiment illustrated in FIG. 1, the image output takes the form of a phosphor plate 38 against which the electrons impinge after traveling the length of the tube. A lead 15 is connected to the phosphor plate 38 to provide additional gain in accelerating electron flow through the tube. A circular recess 40 is provided to receive the output tube 38.

IMAGE INTEGRATION AND TRANSFER PLATE

Figure 2A:
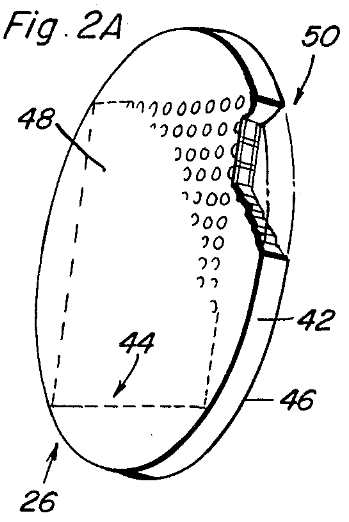
FIG. 2B is a magnified detail view showing the sectional construction of the semiconductor plate of FIG. 2A.

FIG. 2A illustrates in perspective, the disc shape nature of the plate 26. The plate is bounded by a circular periphery 42 and opposite parallel sides 46 and 48. As will be discussed hereinafter, semiconductor elements are located within a generally rectangular area 44, on both sides 46 and 48 of the plate. A section 50 is indicated through the plate 26 and FIG. 2B indicates the detail in magnified form.

Figure 2B:
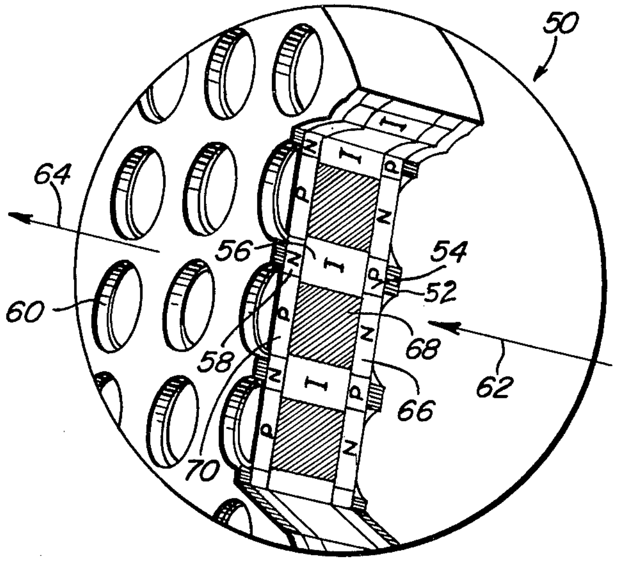

The right side of the plate, as shown in FIG. 2B includes a conducting grid 52, which is identical to the side 46 of the plate shown in FIG. 2A. An oppositely disposed conducting grid 60 in FIG. 2B is identical with the left side 48 of the plate, as illustrated in FIG. 2A. The conducting grids 52 and 60 are composed of a conducting material with a series of regularly spaced and adjacent apertures formed therein. The P semiconductor grid 54 is spaced from the N semiconductor grid 58, the two being separated by an insulative member 56. The semiconductor grids are in direct contact with the conducting grids and have apertures that are in line with but smaller than the conducting grid apertures. A P semiconductor cap makes a direct PN interface with the N semiconductor grid and a N semiconductor cap makes a direct PN interface with the P semiconductor grid in each aperture. Each P cap is electrically connected to an opposite N cap through a conducting fiber. By forward biasing the PN junctions through the conducting grids 52, 60, they maintain nearly the same potential, so that any electron image input that has been integrated and stored is erased. The electron image input is indicated by reference numeral 62. The integration and storage process takes place between the P caps and the N grid of PN materials 58, 70. An electrically conducting fiber 68 is positioned between the PN junction 66, 70.

Figure 3:
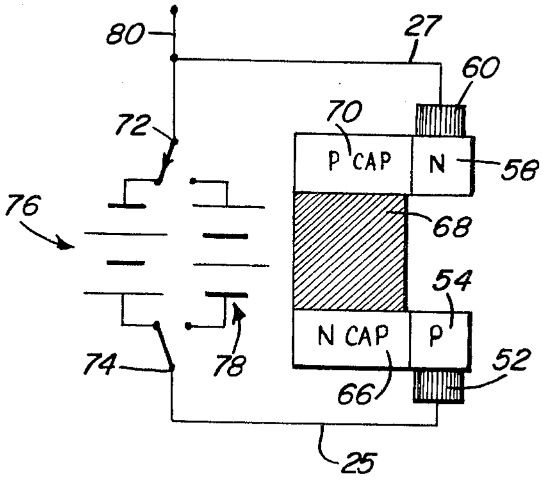
FIG. 3 is a schematic diagram indicating the bias conditions across the plate surfaces.

In order to better appreciate the operation of plate 26, reference is made to FIG. 3. Double pole, double throw switches 72, 74 determine two conditions of biasing the conducting grids 52, 60. At the end of an image transfer operation, the image is to be erased. In order to accomplish this, the switches 72, 74 are set across the potential 76. This forward biases the PN junctions 58–70 and 66–54 essentially shorting the conducting grids 52, 60.

A second condition is set when the switches 72, 74 are switched across the potential generally indicated by reference numberal 78. Under these voltage conditions the PN junctions 58–70 and 66–54 are backed biased causing the PN junctions to be capacitors which permits the integration and storage of an electron image input in the PN interface between caps 70 and the semiconducting grid 58 therebetween.

During the image integration process, electrons strike the N cap 66 with an impact equivalent to about 10,000 ev. For each electron which strikes the N cap 66, about 2,000 electronhole pairs are created. The elecrons migrate to the PN junction between 70 and 58 while the holes migrate to the PN junction between N cap 66 and P grid 54. The electrons are held and stored in the PN interfaces capacitive effect during image integration. A low light, relatively static image can be integrated for one-half minute, or more.

In order to transfer the image axially away from the plate, in the direction of the electron image output 64 (FIG. 2B), an additional potential is applied at the image transfer terminal 80 (FIG. 3), while the switches 72, 74 are in the image integration mode. Electrons are emitted from the conducting grid 60 in an intensified pattern corresponding with the original image.

Referring to FIG. 1, a typical electrical sequence of events are outlined as follows:

Image output off - Photocathode 16 at potential $E_1$. Storage plate grid 52 at potential $E_2$. Transfer grid 60 at potential $E_3$. Output plate 38 at potential $E_4$.

Fiber Electron Optics Zeroing (Erase) - Voltage pulse across storage plate 26 causes conducting fibers 68 (FIG. 3) to go to a common potential due to forward biasing of PN Junctions 58–70 and 66–54 (FIG. 3).

Image Integration - Photocathode 16 at potential $E_1$. Storage plate grid 52 at potential $E_2$. Transfer grid 60 at potential $E_3 + E_{on}$. Output plate 38 at potential $E_4$. $E_{on}$ is the voltage applied in excess of $E_3$, necessary to achieve image integration.

Image Transfer - Photocathode 16 at potential $E_1$. The storage plate grid 52 at potential $E_2$. The transfer grid 60 at potential $E_3 + E_{transfer}$. The latter mentioned potential is applied at terminal 80 of FIG. 2. The output plate 38 is maintained at potential $E_4$.

A typical sequence of events may be as follows:

| | | | |
|---|---|---|---|
| Fiber Electron Optics Zeroing (Erase) | — | 499 | microsec. |
| Image Integration | — | 2000 | microsec. |
| Image Transfer | — | 1 | microsec. |
| Total Time for Frame | — | 2500 | microsec. |
| Frame rate | — | 400 | FPS |

ELECTRON IMAGE RECORDER

Figure 4:
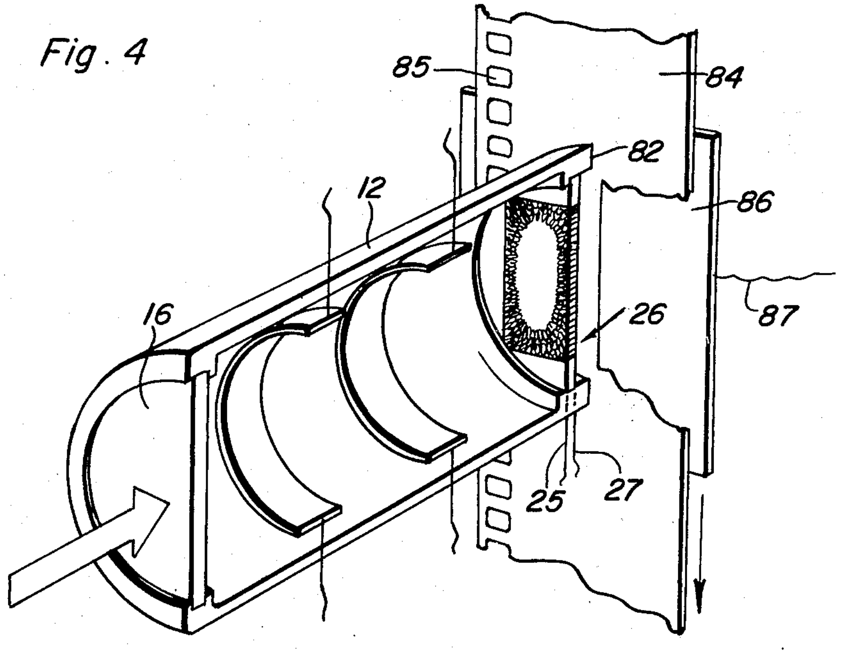
FIG. 4 is a cutaway view of an electron image recorder, utilizing a semiconductor integrating and storage plate.

Referring to FIG. 4, a cutaway view of an electron image recorder is shown. As will be observed, the assembly within the glass envelope 12 is identical with the assembly of components in FIG. 1, to the left and including the integration and transfer plate 26. Adjacent to the right side of the plate 26 is a film backplate 86 which is mounted in parallel spaced relationship to the integration and transfer plate 26, as well as transverse end 82 of the glass envelope 12. An electron sensitive film 84 is moved between the backplate 86 and the transverse end 82. In order to maximize electron exposure of the film and minimize air or gas interference on the electrons, the distance between the integration and transfer plate 26 and the film 84 should be minimized. Conventional photon sensitive films may be used, although modern film technology permits a further optimization of electron images by a more sensitive electron film. Electrostatic type film or paper can also be used. The film 84 may include sprocket holes 85 that permit the film 84 to be moved by a continuous sprocket drive mechanism (not shown). The backplate potential for photon sensitive films must be considerably higher than electrostatic film.

The primary function of the electron image recorder is to permit continuous recording of electron images on the film 84 by electronically controlling the transfer of an electron image from the plate 26 to the film 84, in lieu of mechanical shutter movement of conventional high speed intermittent action cameras.

It is most important that the electron image be stored on plate 26 and quickly transfer therefrom in order to prevent image blur on the film. Conventional photon sensitive film 84 will be exposed by the electron image if the electron image accelerates high enough to have the required electron volts for photon exposure. This is achieved by biasing the film plate 86, at lead 87 in a manner to accelerate electrons from the plate 26 toward the backplate 86.

The following sequence of events summarize the electrical conditions for the various modes of operation:

Image Off - Photocathode 16 at potential $E_1$. Storage plate grid 52 at potential $E_2$. Transfer grid 60 at potential $E_3$. Backplate at potential $E_4$.

Image Integration - Photocathode 16 at potential $E_1$. Storage plate grid 52 at potential $E_2 + E_{on}$. The transfer grid 69 is maintained at potential $E_3$. the backplate 86 is maintained at potential $E_4$.

Image Transfer - Photocathode 16 at potential $E_1$. Storage plate grid 52 at potential $E_2$. The transfer grid 27 is at potential $E_3 + E_{transfer}$. The backplate is maintained at potential $E_4$.

As will be appreciated, the aforementioned potentials correspond to those previously described in connection with the operation of the image integration intensifier tube of FIG. 1. The only difference in the discussion of potentials relates to the potential on the backplate 86. While discussing FIG. 1, this potential was discussed in connection with the output plate 38.

A time sequence for the aforementioned steps is typically as follows:

| | |
|---|---|
| Image Integration | 4000 microsec. |
| Image Transfer to Film | 1 microsec. |
| Image Off | 999 microsec. |
| Total Time | 5000 microsec. |
| Frame Rate | 200 FPS |

IMAGE INTEGRATION FLASH TRANSFER PLATE

Figure 6:
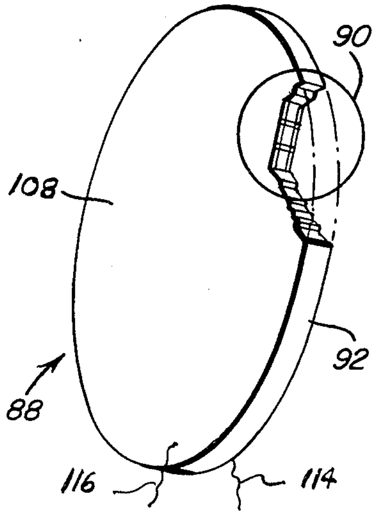
FIG. 6 is a perspective view illustrating the overall appearance of the image integration and flash transfer plate.
Figure 7:
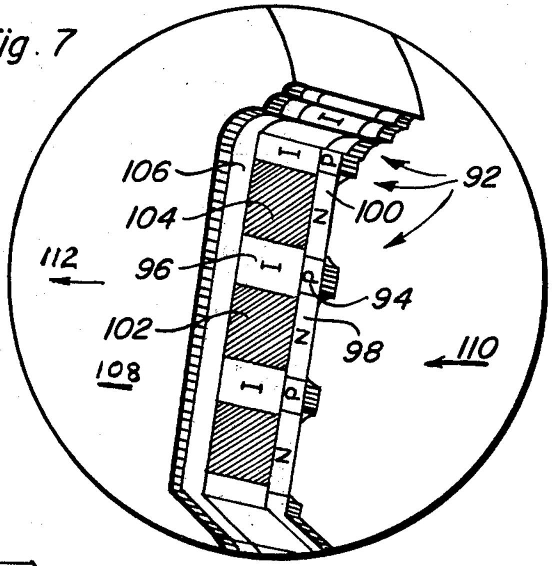
FIG. 7 is a magnified, sectional view of the detail which comprises the image integration and flash transfer plate.

In lieu of the phosphor output plate 38, in FIG. 1, a different type of output plate may be employed. It is referred to as an Image Integration Flash Transfer Plate 88 (IIFTP). As can be seen in FIG. 6, the overall contour of the output plate is disc-shaped, similar to the phosphor plate 38 (FIG. 1). A detail sectional view of the portion generally indicated by reference numeral 90 is shown in FIG. 7. In this regard, it will be observed that the sectional structure is quite similar to the image integration and transfer plate of FIG. 2B.

Figure 5:
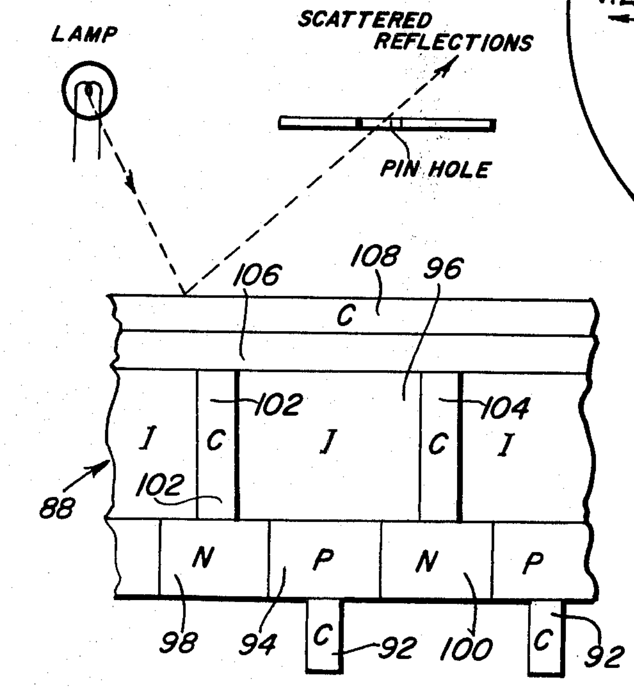
FIG. 5 is a partial sectional view of an image integration and flash transfer plate, somewhat similar in construction to the integration and storage plate of FIG. 2A, 2B.

Referring to FIGS. 5 and 7, the electron image input 110 impinges upon semiconductor N caps 98. PN material 98, 94, form a single layer, as in the case of the image integration and transfer plate (FIG. 2B). Semiconductor grid 94 makes direct contact with conductor grid 92 with the apertures of 94 smaller than the apertures of 92. N semiconductor caps 98 are in the grid 94 apertures and form PN junctions with the grid.

An electron image may, hypothetically, cause more electrons to be stored in the conductor 102, than conductor 104. With a deformographic film 106 capping the conductors 102 and 104, the difference in the electron densities will cause a deformation of the film. The film may be fabricated from a rubber polymer. In order to make use of the deformographic film as a light scattering device, it is coupled with a reflective conductive metal film 108 which will conform to the deformations of the deformographic film 106. The deformations in the reflective film 108 will correspond to the electron image impinging upon the flash transfer plate, which will in turn correspond with the original image input at the photocathode 16 (FIG. 2). An optical image may be retrieved by shining light upon the outer surface of the reflective film 108. More light will scatter from reflection off the film 108, above the conductor 102 than 104 due to the hypothetical greater concentration of electron storage in the left conductor 102 when compared with conductor 104. If the reflected images were passed through a pin hole, the scattered light would be lost and the viewing screen placed behind the pin hole would reconstruct the original image input.

The flash transfer plate 88 may be utilized as the output plate of an image intensifier tube, microchannel intensifier, or proximity focused intensifier. Each high energy electron, from an impinging electron image, striking the N semiconductor caps 98 create many low energy (up to 2,000) electron - hole pairs. The caps receive most of the high energy electrons because the surrounding P semiconductor components 94 and metal conductor grids 92 are negative with respect to the caps. During image integration the thin film conductor 108, on the output side of the plate, is positive with respect to the conducting grid 92 on the input side of the plate. This biases the PN junctions in reverse, causing them to act like capacitors. The output thin film conductor 108, the deformographic film 106, and the fiber conductors 102 form capacitors in series parallel with the input PN capacitors. The freed electrons migrate toward the deformographic film 106 and the holes toward the PN interface where they are stored. The electron image released at a photocathode, in an intensifier tube, integrates upon the conductor fibers at their interface with the deformographic film. The electron charges cause the film to deform. The deformation is an indirect and amplified image of the photon image striking a photocathode of an image intensifier tube, where the present flash plate 88 is to be used. A short flash of light through suitable optics is reflected off the deformographic film 108 and focused on a screen or photographic film. The flash plate 88 may the be zeroed or erased by forward biasing the low plate. The forward bias causes the PN junctions to become low impedance resistive devices and bias voltage is predominantly across the fiber-conductor-thin film capacitances. The bias is then reduced to an optimum level across the capacitors for best operation of the plate. The reverse bias is then reinitiated and the next integration of an electron image begins.

In the event the flash plate 88 is utilized in a high frame image recorder, such as that described in connection with FIG. 4, the output image is flashed on continuous motion film for a very short interval of time so that the film appears to be motionless. A typical example of timing is as follows:

| | |
|---|---|
| erasing previous image stored in the plate | 99 microsec. |
| integrate image on fiber output capacitors | 900 microsec. |
| flash image onto film | 1 microsec. |
| film motion | 70 mm/ms |
| frame rate | 1000 frames/sec |

As indicated in FIG. 6, leads or electrodes 114 and 116 are respectively connected to the conducting grid 92 and the reflective conductive metal film 108. FIG. 7 indicates the electron image input along direction 110 and the electron image output along direction 112.

In summary, the aforementioned specification has explained the utilization of a semiconductor plate to achieve integration and transfer of an electron image to permit the continuous recording of images under electronic control, rather than mechanical shutter control. As previously mentioned, electron image optics has particular application for low light level image recording and/or where frame rates and image resolution must be high.

It should be understood that the invention is not limited to the exact details of construction shown and described herein for obvious modifications will occur to persons skilled in the art.

I claim:

1. An electron image recorder comprising:

means for converting an input image to an electron image;

means positioned in the path of the electron image for storing and integrating the image during a first time interval, and transferring an intensified electron image therefrom during a second time interval; and means, positioned in a path receiving the transferred electron image, for supporting electron sensitive film;

further, the integratng and storing means comprising:

first and second spaced conducting grids;

P and N semiconductor caps positioned in aligned spaced relationship to each other, the N caps located in a first plane while the P caps are located in a second plane, the P and N semiconductor caps further being positioned inwardly of the conducting grids and insulated from the conducting grids;

conductor means located inwardly of the conducting grids and connected between the P and N semiconductor caps;

P and N semiconductor biasing means connected between the conductor grid and respectively adjacent N and P semiconductor caps creating respective PN junctions therebetween for storing electrons therein during the first time interval; and means connected to the conductor grids for biasing the grids and causing emission of stored electrons into space during the second time interval.

2. The subject matter of claim 1 wherein the P and N biasing means comprises P and N semiconductor grids positioned in insulated relation to each other, the P semiconductor grids being mounted in the first plane and the N semiconductor grids being mounted in the second plane.

* * * * *